US012664467B2

(12) United States Patent
Mori

(10) Patent No.: US 12,664,467 B2
(45) Date of Patent: Jun. 23, 2026

(54) LEARNING DEVICE, LEARNING METHOD, CONTROL SYSTEM, AND RECORDING MEDIUM

(71) Applicant: NEC Corporation, Tokyo (JP)

(72) Inventor: Tatsuya Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 705 days.

(21) Appl. No.: 18/018,480

(22) PCT Filed: Sep. 2, 2020

(86) PCT No.: PCT/JP2020/033265
§ 371 (c)(1),
(2) Date: Jan. 27, 2023

(87) PCT Pub. No.: WO2022/049672
PCT Pub. Date: Mar. 10, 2022

(65) Prior Publication Data
US 2023/0306302 A1     Sep. 28, 2023

(51) Int. Cl.
*G06N 20/00*          (2019.01)

(52) U.S. Cl.
CPC .................................. *G06N 20/00* (2019.01)

(58) Field of Classification Search
CPC ......... G06N 20/00; G06N 3/006; G06N 3/092
See application file for complete search history.

(56) References Cited

U.S. PATENT DOCUMENTS

2020/0302347 A1     9/2020   Tanimoto

FOREIGN PATENT DOCUMENTS

WO        2019/050014 A1     3/2019

OTHER PUBLICATIONS

"Addressing Function Approximation Error in Actor-Critic Methods" Fujimoto et al. (Year: 2018).*
"Prioritized Experience Replay" Tom Schaul et al. (hereinafter Schaul) (Year: 2016).*
International Search Report for PCT Application No. PCT/JP2020/033265, mailed on Oct. 27, 2020.
Fujimoto,Scott, et al., "Addressing Function Approximation Error in Actor-Critic Methods", arXiv:1802.09477v3, [online], arXiv (Cornell University), Oct. 22, 2018, version v3, pp. 1-15, [retrieved on Oct. 9, 2020].
Schaul, Tom, et al., "Prioritized Experience Replay", arXiv:1511.05952v4, [online], arXiv (Cornell University), Feb. 25, 2016, version v4, pp. 1-21, [retrieved on Oct. 8, 2020].

* cited by examiner

*Primary Examiner* — Pei Yong Weng
(74) *Attorney, Agent, or Firm* — Sughrue Mion, PLLC

(57)          ABSTRACT

A learning device uses, on the basis of a second state corresponding to a first action of a control subject in a first state and a second action calculated from the second state using a policy model, uses a plurality of evaluation models that each calculate a second evaluation value, which is an index value of the goodness of the second action in the second state, to respectively calculate the second evaluation values; and updates the evaluation model on the basis of the smallest second evaluation value among the plurality of second evaluation values, and a first evaluation value, which is an index value of the goodness of the first action in the first state.

4 Claims, 7 Drawing Sheets

FIG. 1

LEARNING DEVICE, LEARNING METHOD, CONTROL SYSTEM, AND RECORDING MEDIUM

This application is a National Stage Entry of PCT/JP2020/033265 filed on Sep. 2, 2020, the contents of all of which are incorporated herein by reference, in their entirety.

TECHNICAL FIELD

The present invention relates to a learning device, a learning method, a control system, and a recording medium.

BACKGROUND ART

One type of machine learning is called reinforcement learning.

For example, Patent Document 1 describes executing reinforcement learning called Q-learning to optimize the maintenance range of a target for which maintenance is required.

CITATION LIST

Patent Literature

[Patent Document 1] PCT International Publication No. 2019/050014

SUMMARY OF THE INVENTION

Problems to be Solved by the Invention

The time required for reinforcement learning is preferably relatively short.

One of the example objects of the present invention is to provide a learning device, a learning method, a control system, and a recording medium that can solve the above problem.

Means for Solving the Problems

According to the first example aspect of the present invention, a learning device is provided with: a model calculation means for, on the basis of a second state corresponding to a first action of a control subject in a first state and a second action calculated from the second state using a policy model, using a plurality of evaluation models that each calculate a second evaluation value, which is an index value of the goodness of the second action in the second state, to respectively calculate the second evaluation values; and a model updating means that updates the evaluation model on the basis of the smallest second evaluation value among the plurality of second evaluation values, and a first evaluation value, which is an index value of the goodness of the first action in the first state.

According to the second example aspect of the present invention, a control system is provided with: a model calculation means that, on the basis of a second state corresponding to a first action of a control subject in a first state and a second action calculated from the second state using a policy model, uses a plurality of evaluation models that each calculate a second evaluation value, which is an index value of the goodness of the second action in the second state, to respectively calculate the second evaluation values; an evaluation model updating means that updates the evaluation model on the basis of the smallest second evaluation value among the plurality of second evaluation values, and a first evaluation value, which is an index value of the goodness of the first action in the first state; a policy model updating means that updates the policy model using the evaluation model; a control determination means that calculates the control value using the policy model; and a control implementation means that controls the control subject on the basis of the control value.

According to the third example aspect of the present invention, a learning method includes the steps of: using, on the basis of a second state corresponding to a first action of a control subject in a first state and a second action calculated from the second state using a policy model, a plurality of evaluation models that each calculate a second evaluation value, which is an index value of the goodness of the second action in the second state, to respectively calculate the second evaluation values; and updating the evaluation model on the basis of the smallest second evaluation value among the plurality of second evaluation values, and a first evaluation value, which is an index value of the goodness of the first action in the first state.

According to the fourth example aspect of the present invention, a recording medium records a program for causing a computer to execute processing including: using, on the basis of a second state corresponding to a first action of a control subject in a first state and a second action calculated from the second state using a policy model, a plurality of evaluation models that each calculate a second evaluation value, which is an index value of the goodness of the second action in the second state, to respectively calculate the second evaluation values; and updating the evaluation model on the basis of the smallest second evaluation value among the plurality of second evaluation values, and a first evaluation value, which is an index value of the goodness of the first action in the first state.

Advantageous Effects of Invention

According to the learning device, control system, learning method, and recording medium described above, it is possible to shorten the time required for reinforcement learning.

BRIEF DESCRIPTION OF THE DRAWINGS

FIG. 1 is a diagram showing a configuration example of the control system according to the example embodiment.

EXAMPLE EMBODIMENT

Figure 2:
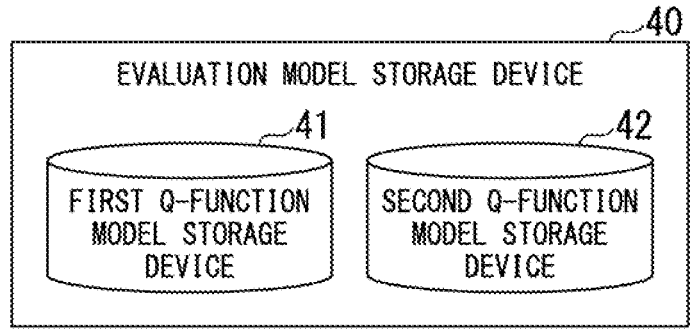
FIG. 2 is a diagram showing a configuration example of the evaluation model storage device according to the example embodiment.

As will be described later in Example 2, the control device according to the example embodiment determines, for example, control content for controlling a chemical plant based on a policy model calculated according to reinforcement learning. Observation devices are installed in a chemical plant to measure temperature, pressure, flow rate, and the like. The control device determines a policy model for determining the control content for each device in the chemical plant based on the measurement results measured by the observation device. Then, the control device determines the control content according to the determined policy model, and controls each device according to the determined content.

As will be described later in Example 3, the control device according to the example embodiment determines, for example, control content for controlling a robot based on a policy model calculated according to reinforcement learning. The robot to be controlled has a plurality of joints. A robot control system is equipped with an observation device for measuring joint angles and the like. The control device determines a policy model for determining the control content of the robot based on the measurement results measured by the observation device. Then, the control device determines the control content according to the determined policy model, and controls the robot according to the determined content.

The application of the control device according to the example embodiment is not limited to the examples described above, and may be, for example, a manufacturing device in a manufacturing factory, a transportation device, or the like.

Description of Terms and Concepts

Terminology and concepts for describing the example embodiment will be explained.

Reinforcement learning is a method of obtaining an action decision rule that maximizes the expected value of a cumulative reward under unknown state transition probabilities in the Markov decision process. The action decision rule is also called a policy or control rule.

The Markov decision process represents a process in which the following series of events are repeated: "when in a certain state s, an action a is selected and executed according to a policy π, a transition is made from the state s to a new state s' according to the state transition probability ρ(s', r|s, a); and a reward r is given".

A policy may be one that calculates actions probabilistically. Alternatively, one can write a policy that uses the delta distribution to uniquely compute actions. A policy that uniquely calculates an action is called a deterministic policy and is functionally expressed as $a_t = \pi(s_t)$. $a_t$ indicates the action at time t. π is a function indicating policy. $s_t$ indicates the state at time t. That is, a policy can be said to be a model (or function) that calculates (or determines or selects) an action $a_t$ at time t from state $s_t$ at time t.

A cumulative reward is the sum of rewards earned over a period of time. For example, the cumulative reward $R_t$ from a certain time t to (t+T) is represented by Equation (1).

[Equation 1]

$$R_t = \sum_{t'=t}^{t+T} r_{t'} \gamma^{t'-t} \tag{1}$$

γ is a real constant of y∈ [0,1]. γ is also called a discount rate. $r_t$ is the reward at time t. Regarding this cumulative reward, the conditional expected value of the cumulative reward with respect to the state transition probability ρ and the policy π when the state $s_t$ and the action $a_t$ at time t are given is expressed as $Q^\pi(s_t, a_t)$, and defined as in Equation (2).

[Equation 2]

$$Q^\pi(s_t, a_t) \equiv \underset{\rho,\pi}{E}[R_t \,|\, s_t, a_t] \tag{2}$$

$Q^\pi(s_t, a_t)$ in Equation (2) is called the Q-function (or action value function). E represents the expected value.

A policy π that maximizes the value of Equation (3) for all states s is called an optimal policy.

[Equation 3]

$$\underset{a\sim\pi(\cdot|s)}{E} Q^\pi(s, a) \tag{3}$$

Here, action a is sampled from policy π, which is denoted as a~π(·|s). The optimal policy is denoted as π*.

The Q-function when the policy is the optimal policy π* is called the optimal Q-function. The optimal Q-function is denoted as Q*(s, a).

Basically, the optimal policy π* is a deterministic policy that "outputs an action a that maximizes the optimal Q-function." That is, it can be written as Equation (4).

[Equation 4]

$$\pi^*(s) = \underset{a}{\mathrm{argmax}} Q^*(s, a) \tag{4}$$

In reinforcement learning, a model of a Q-function and a model of a policy are prepared, the model of the Q-function is brought closer to the optimal Q-function through learning, and the model of the policy is brought closer to the optimal policy based on the model of the Q-function. Hereinbelow, the model of the Q-function will be called the Q-function model, and the model of the policy will be called the policy model.

\<Explanation of Using Multiple Q-Function Models>

In the example embodiment, a case where the policy is a deterministic policy will be described as an example, but a non-deterministic policy may be used.

Multiple Q-function models are used in the example embodiment to mitigate overestimation of a Q-function model. A case where two Q-function models are used will be described as an example, but three or more Q-function models may also be used.

The reason why preparing two Q-function models leads to mitigation of overestimation of the Q-function models will be explained. For example, consider optimizing the Q-function model based on the mean-square temporal difference (TD) error using the experience replay technique for a Markov decision process in which the action is a continuous value.

A TD error $\delta^{TD}$ is defined as in Equation (5).

[Equation 5]

$$\delta^{TD}=(s,\ a,\ s'r,\ \phi,\ \theta,\ \theta')=y-Q_\theta(s,\ a) \tag{5}$$

The TD error $\delta^{TD}$ indicates the difference between the expected reward and the actual reward.

y is represented by Equation (6) and plays a role similar to a teacher signal for supervised learning in machine learning.

[Equation 6]

$$y=r+\gamma Q_{\theta'}(s',\ \pi_\theta(s')) \tag{6}$$

y is also called a teacher signal.

$\phi$ is a parameter of the policy model.

$\theta$ is a parameter of the Q-function model. $\theta'$ is a target parameter for stabilizing the updating of the Q-function model. The target parameter $\theta'$ basically uses a past value of $\theta$ and is periodically updated to the latest value of $\theta$. While the value of the parameter $\theta$ is updated during learning and the Q-function using $\theta$ changes, by delaying the update of the value of the target parameter $\theta'$ with respect to the update of $\theta$, it is possible to suppress rapid changes in the value of the teacher signal y, whereby the learning is expected to be stable.

Updating the value of a parameter is also referred to as updating the parameter. As the parameters of the model are updated, the model is also updated.

The parameter $\theta$ of the Q-function model is explicitly written as "$Q_\theta$". The Q-function indicated by the Q-function model $Q_\theta$ is also referred to as the Q-function $Q_\theta$. When "$\theta$" of "$Q_\theta$" is regarded as a parameter variable, "$Q_\theta$" indicates a Q-function model. On the other hand, when "$\theta$" of "$Q_\theta$" is regarded as a parameter value, "$Q_\theta$" indicates the Q-function.

The parameter $\phi$ of the policy $\pi$ is explicitly written as "$\pi_\phi$". A policy indicated by the policy model $\pi_\phi$ is also referred to as the policy $\pi_\phi$. When "$\phi$" of "$\pi_\phi$" is regarded as a parameter variable, "$\pi_\phi$" indicates a policy model. On the other hand, when "$\phi$" of "$\pi_\phi$" is regarded as a parameter value, "$\pi_\phi$" indicates a policy.

For learning the parameter $\theta$ of the Q-function model, the loss function J($\theta$) of Equation (7) can be used.

[Equation 7]

$$J(\theta) = \underset{(s,a,r,s')\sim B}{E}\left[\left\{\delta^{TD}(s,\ a,\ s',\ r,\ \phi,\ \theta,\ \theta')\right\}^2\right] \tag{7}$$

B is a mini-batch of experiences sampled from an experience storage device that stores experiences. An "experience" is a state transition that occurred in the past. This experience is represented by (s, a, r, s'), which is a combination of state s, action a for state s, reward r for action a, and next state s' for action a. (s, a, r, s')~B denotes the experience (s, a, r, s') contained in mini-batch B.

Since the teacher signal y depends on the parameter $\theta'$, which changes during learning, the teacher signal y changes during the optimization of the Q-function model.

Assuming a deterministic policy for the policy model $\pi_\phi$, the parameter $\phi$ is updated to output a that maximizes $Q_\theta$ with another update rule.

As another update rule referred to here, various update rules for updating the value of the parameter $\phi$ can be used so that the policy $\pi$ outputs an action a that maximizes the value of $Q_\theta$.

For example, with the objective function $J_\pi(\phi)=[Q_\theta(s,\pi_\phi(s))]$, an update rule that applies the stochastic gradient method so as to maximize the value of this objective function $J_\pi(\phi)$ may be used, but is not limited thereto.

One of the reasons why it takes time to learn the Q-function is the problem of overestimation of the Q-function. The problem with overestimation of the Q-function is $Q_{\theta'}(s', \pi_\phi(s'))$ in Equation (6). If the target parameter $\theta'$ and the synchronization source parameter $\theta$ are not well approximated to the true Q-function $Q^{\pi\phi}$ as the expected value of the cumulative reward for the policy $\pi_\phi$, because $\pi_\phi(s)$ "outputs a that maximizes $Q_\theta$ which is not well approximated," an excessive bias is introduced that causes the output value of the Q-function model to be larger than the output value of the true Q-function. As a result, learning using equations (5) to (7) updates $\theta$ in the wrong direction.

Therefore, in the example embodiment, two Q-function models are prepared, the output values thereof are compared, and the smaller output value is used to mitigate the overestimation of the Q-function. In other words, this is expected to reduce the time required for learning as the model update stabilizes.

In the example embodiment, a case where a plurality of Q-function models are configured by applying different parameter values to the same Q-function model body will be described as an example.

Specifically, the control system according to the example embodiment configures the first Q-function model by applying the parameter $\theta_1$ to the Q-function model body common to the two Q-function models. Also, the control system configures a second Q-function model by applying the parameter $\theta_2$ to the Q-function model body.

Then, the control system uses a loss function using the value of the first Q-function model and the smaller of the first Q-function model and the second Q-function model to update the value of the parameter $\theta_1$ of the first Q-function model. Then, the control system uses a loss function using the value of the second Q-function model and the smaller of the first Q-function model and the second Q-function model to update the value of the parameter $\theta_2$ of the second Q-function model.

For example, the above Equation (5) changes to Equation (8).

[Equation 8]

$$\delta^{TD}_{CDQ}(s,\ a,\ s',\ r,\ \phi,\ \theta_1,\ \theta'_1,\ \theta'_2) \equiv y_{CDQ} - Q_{\theta_1}(s,\ a) \tag{8}$$

A model representing the Q-function $Q_{\theta 1}(s, a)$ in Equation (8) corresponds to an example of the first Q-function model. A model representing the Q-function $Q_{\theta 2}(s, a)$ corresponds to an example of the second Q-function model. The Q-function $Q_{\theta 2}(s, a)$ is a Q-function represented by the Q-function model $Q_{\theta 2}(s, a)$ obtained by replacing the parameter $\theta_1$ of the Q-function model $Q_{\theta 1}(s, a)$ with the parameter $\theta_2$.

$y_{CDQ}$ is shown as in Equation (9).

[Equation 8]

$$y_{CDQ} \equiv r + \gamma \min_{i=1,2} Q_{\theta'_i}(s', \pi_\phi(s')) \tag{8}$$

$y_{CDQ}$ is also called a teacher signal.

The loss function $J(\theta)$ of the above Equation (7) is changed to the loss function $J_{QM}(\theta_1)$ of Equation (10).

[Equation 10]

$$J_{QM}(\theta_1) = \underset{(s,a,r,s') \sim B}{E} \left[ \left\{ \delta^{TD}_{CDQ}(s, a, s', r, \phi, \theta_1, \theta'_1, \theta'_2) \right\}^2 \right] \tag{10}$$

Equations (8) to (10) are update rules for $\theta 1$ of the two parameters $\theta_1$ and $\theta_2$ of the Q-function model. $\theta_2$ is also optimized by an update rule in which $\theta_1$ is replaced by $\theta_2$ in equations (8) to (10). Since there are two Q-function models, $\theta'_1$ and $\theta'_2$ are used as the target parameters, respectively, and the target parameter with the smaller output value is used for the calculation of the teacher signal.

However, the control system may configure a plurality of Q-function models using a different Q-function model body for each Q-function. In this case also, the control system updates the parameters for each Q-function model using a loss function that uses the values of individual Q-function models and the minimum value of a plurality of Q-function models.

"$Q_{\theta'i}(s', \pi_\phi(s'))$" in Equation (9) indicates the application of a state s' and the action $\pi_\phi(s')$ obtained by applying the state s' to the policy $\pi_\phi$ to the Q-function model $Q_{\theta'i}$. This "$Q_{\theta'i}(s', \pi_\phi(s'))$" indicates a conditional expectation of the cumulative reward when the state s' is given and the action $\pi_\phi(s')$ is obtained according to the state s'. In this respect, the Q-function model $Q_{\theta'i}$ can be described as a model that evaluates (or estimates) the goodness (or value, effectiveness, desirability) of the action $\pi_\phi(s')$ in the state s'. The value of the Q-function model $Q_{\theta'}$ can be described as an index value of the goodness (or value, effectiveness, desirability) of the action $\pi_\phi(s')$ in the state s'.

State s corresponds to an example of the first state. Action a corresponds to an example of the first action. A transition destination state s' when the control subject performs action a, which is the first action, in state s, which is the first state, corresponds to an example of the second state. The action $\pi_\phi(s')$ obtained by applying the state s', which is the second state, to the policy $\pi_\phi$ corresponds to an example of the second action.

The Q-function $Q_{\theta'i}$ corresponds to an example of the second action evaluation function. The second action evaluation function referred to here is a function for calculating the evaluation value of the second action in the second state.

The Q-function value $Q_{\theta'i}(s', \pi_\phi(s'))$ obtained by applying the state s' and the action $\pi_\phi(s')$ to the Q-function corresponds to an example of the second action evaluation value. The second action evaluation value referred to here is the evaluation value of the second action in the second state. The second action evaluation value is also called a second evaluation value.

The Q-function model $Q_{\theta'i}$ corresponds to an example of the second action evaluation function model. The second action evaluation function model referred to here is a model of the second action evaluation function. By determining the parameter values of the second action evaluation function model, the second action evaluation function model represents one second action evaluation function.

However, the evaluation means for the second action in the example embodiment is not limited to one represented in the form of a function (second action evaluation function). Various means capable of outputting an evaluation value of the second action in response to the input of the second state and the second action can be used as the evaluation means of the second action. For example, the evaluation means for the second action may output evaluation values with fluctuations such as white noise. In this case, the evaluation means for the second action may output different evaluation values for the same input of the second state and second action.

Since the means for evaluating the second action is not limited to the one represented in the form of a function, the evaluation model for the second action in the example embodiment is also not limited to a model indicating a function (second action evaluation function model). Thus, the evaluation model of the second action, which is not limited to the model representing the function, is called the second action evaluation model, or simply the evaluation model.

The Q-function model $Q_{\theta'i}$ also corresponds to an example of the function model.

In addition, in order to further mitigate overestimation of the Q-function model, the example embodiment prioritizes experiences and so preferentially uses high-priority experiences for learning. This technique is called prioritized experience replay (PER).

Specifically, each past experience is associated with a "priority" and stored in a "priority storage device". An experience acquirer then selects experiences based on priority to build a mini-batch. Experiences within a mini-batch are used for model updating, so higher priority experiences are more likely to be used for updating. It also computes new priority values for the experiences within the mini-batch and updates the priorities.

Configuration in Example Embodiment

Figure 1:
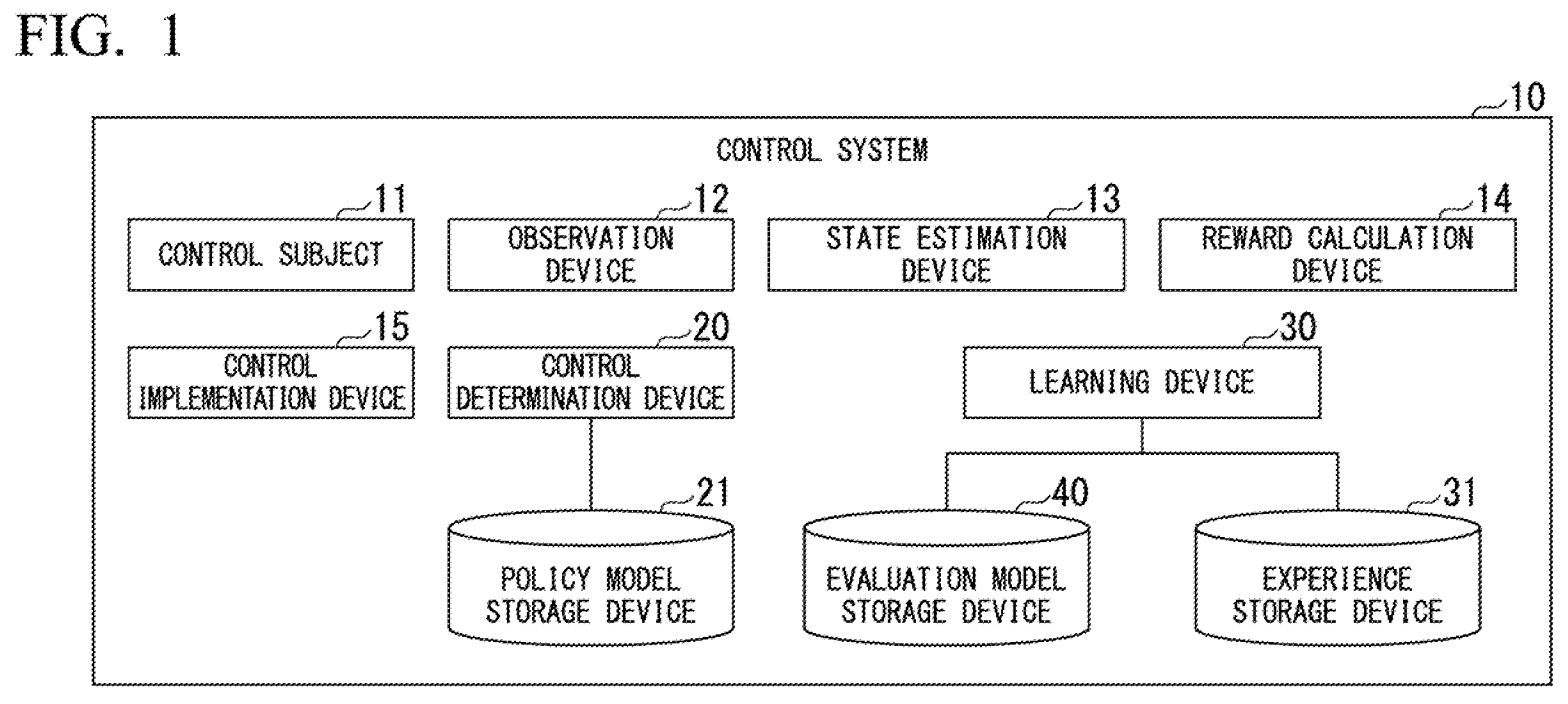

FIG. 1 is a diagram illustrating a configuration example of a control system according to the example embodiment. In the configuration shown in FIG. 1, the control system 10 is provided with an observation device 12, a state estimation device 13, a reward calculation device 14, a control implementation device 15, a control determination device 20, a policy model storage device 21, a learning device 30, an experience storage device 31, and an evaluation model storage device 40.

A control subject 11 is an object to be controlled by the control system 10. Various controllable items can be used as the control subject 11. The control subject 11 may be part of the control system 10. Alternatively, the control subject 11 may be configured outside the control system 10.

The observation device 12 observes information used for state estimation of the control subject 11.

The state estimation device 13 estimates the state of the control subject 11 based on the information obtained from the observation device 12.

The reward calculation device 14 calculates a reward according to, for example, a "score (reward) calculation rule for a state" specified by the user. However, the method by which the reward calculation device 14 acquires the reward is not limited to a specific method. As a method by which the reward calculation device 14 obtains the reward, various methods that can obtain the reward according to the state can be used.

When a certain state s and a certain action a are determined, the state s' of the transition destination from the state s by the action a is determined. Then, the reward calculation device 14 can calculate a reward corresponding to the state s'. In this respect, the reward can be said to be an index value representing the goodness (or effectiveness, value, or desirability) of a certain action in a certain state.

A reward corresponds to an example of a first action evaluation value. The first action evaluation value referred to here is the evaluation value of the first action in the first state. The first action evaluation value is also called the first evaluation value.

The control implementation device 15 controls the control subject 11 according to the control value output by the control determination device 20.

The control implementation device 15 corresponds to an example of the control implementation means.

The control determination device 20 refers to the state estimated by the state estimation device 13 and the policy model stored in the policy model storage device 21, calculates the policy t, and outputs a control value.

The control determination device 20 corresponds to an example of the control determination means.

The policy model storage device 21 stores a policy model that outputs a control value in response to the input of a state. For example, the policy model storage device 21 stores the policy model body and the parameter ϕ of the policy model. A policy model can be obtained by applying the parameter ϕ to the policy model body.

The learning device 30 one by one adds and records the state s output by the state estimation device 13, the action a of the control subject based on the control value output by the control determination device 20, the reward r output by the reward calculation device 14, and the state output by the state estimation device 13 immediately after the action a is performed by the control of the control implementation device 15, that is, the set (s, a, r, s') of the state s' after the state transition, that is, the experience, in the experience storage device 31. Here, one by one means, for example, each time the control implementation device 15 performs control on the control subject 11.

The learning device 30 also updates the policy model storage device 21 and the evaluation model storage device 40 by referring to the policy model storage device 21, the evaluation model storage device 40, and the experience storage device 31. Specifically, the learning device 30 refers to the models and experiences stored in these storage devices to update the parameters of these models.

FIG. 2 is a diagram showing a configuration example of the evaluation model storage device 40. With the configuration shown in FIG. 2, the evaluation model storage device 40 is provided with a first Q-function model storage device 41 and a second Q-function model storage device 42.

The first Q-function model storage device 41 stores the parameter $\theta_1$ of the above-described first Q-function model. The second Q-function model storage device 42 stores the parameter $\theta_2$ of the above-described second Q-function model.

The evaluation model storage device 40 also stores a Q-function model body common to the first Q-function model and the second Q-function model. Either or both of the first Q-function model storage device 41 and the second Q-function model storage device 42 may store the Q-function model body. Alternatively, the evaluation model storage device 40 may have a storage area different from the first Q-function model storage device 41 and the second Q-function model storage device 42 to store the Q-function model body.

As a result, the evaluation model storage device 40 stores two Q-function models used for evaluating the performance of the policy recorded in the policy model storage device 21 and for alleviating the above-described overestimation problem of the Q-function model. In particular, the evaluation model storage device 40 stores parameters for each of these two Q-function models.

Figure 3:
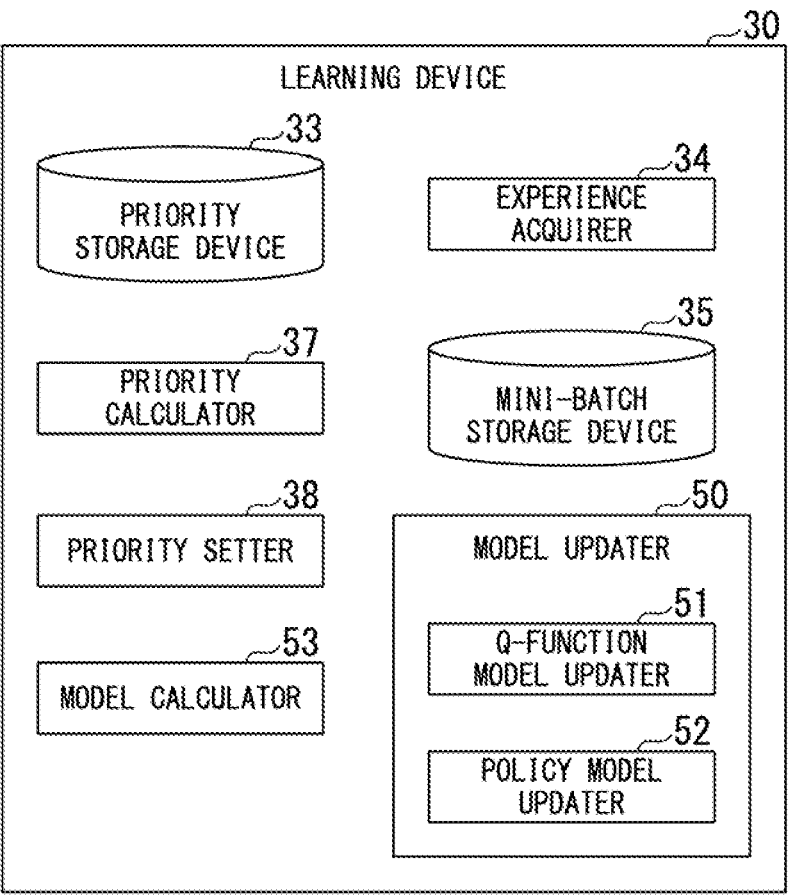
FIG. 3 is a diagram showing a configuration example of the learning device according to the example embodiment.

FIG. 3 is a diagram showing a configuration example of the learning device 30. In the configuration shown in FIG. 3, the learning device 30 is provided with a priority storage device 33, an experience acquirer 34, a mini-batch storage device 35, a priority calculator 37, a priority setter 38, a model updater 50, and a model calculator 53. The model updater 50 includes a Q-function model updater 51 and a policy model updater 52.

The priority storage device 33 stores a priority corresponding to each experience stored by the experience storage device 31. This priority is calculated by the priority calculator 37.

The experience acquirer 34 configures a sampled mini-batch by performing prioritized sampling of experiences from the experience storage device 31 according to the priorities stored in the priority storage device 33. When configuring a mini-batch, the index i of each experience is also included. This is so that it can be confirmed which experience in the experience storage device 31 corresponds to the experience in the mini-batch. The configured mini-batch is temporarily stored in mini-batch storage device 35 until the next sampling.

The experience acquirer 34 corresponds to an example of the experience acquisition means.

The priority calculator 37 uses the first Q-function model storage device 41 and the second Q-function model storage device 42 to calculate the priority of each experience in the mini-batch. Specifically, the priority calculator 37 uses Equation (11) to set the index of whichever of the parameters $\theta_1$ and $\theta_2$ has a larger Q-function value to $\kappa_b$.

[Equation 11]

$$k_b = \operatorname*{argmax}_{k=1,2} Q_{\theta_k}(s_b, a_b) \tag{11}$$

Then, the priority calculator 37 calculates a new priority $P'_b$ using Equation (12).

[Equation 12]

$$P'_b = \left| r_b + \gamma \min_{i=1,2} Q_{\theta'_i}(s'_b, \pi_\theta(s'_b)) - Q_{\theta_k}(s_b, s_b) \right| \tag{12}$$

Here the index b is an experience index, indicating that the experience is stored in a mini-batch. An experience identified by the index b is also referred to as an experience of index b.

$s_b$ denotes the state in an experience of index b. $a_b$ denotes the action for the state $s_b$ in the experience of index b. $r_b$ denotes the reward for the action ab under the state $s_b$ in the experience of index b. $s'_b$ indicates the state of the transition destination as a result of the action $a_b$ under the state $s_b$ in the experience of index b.

The priority calculator 37 inputs $(s_b, a_b)$ to each of the two Q-function models, compares the obtained output values, uses the model with the larger value (see Equation (11)), and calculates the absolute value of the TD error as the new priority $P'_b$ (see Equation (12)).

The new priority $P'_b$ that was calculated is output to the priority setter 38. The priority setter 38 refers to the experience index in the mini-batch and overwrites each priority corresponding to the index of the experience in the priority storage device 33. That is, the priority setter 38 updates the priority of the experience in index b.

In addition, the priority setter 38, refers to the priority storage device 33, assigns an initial value of priority to an experience that is newly added and is not associated with a priority. For example, the priority setter 38 refers to each priority linked to all experiences stored in the priority storage device 33, and links the priority that takes the maximum value (that is, the highest priority) to the newly added experience.

The priority setter 38 corresponds to an example of the priority setting means.

The model updater 50 refers to the mini-batch stored in the mini-batch storage device 35 and the experience priority calculated by the priority calculator 37 to update the parameters $\theta_1$, $\theta_2$, and $\phi$. The model updater 50 corresponds to an example of the experience acquisition means.

As mentioned above, the parameter $\theta_1$ is the parameter of the first Q-function model. The first Q-function model storage device 41 stores the parameter $\theta_1$. The parameter $\theta_2$ is a parameter of the second Q-function model. The second Q-function model storage device 42 stores the parameter $\theta_2$. The policy model storage device 21 stores the parameter $\phi$.

The Q-function model updater 51 updates the parameters $\theta_1$ and $\theta_2$. Specifically, the Q-function model updater 51 updates the parameter $\theta_1$ so as to reduce the value of the loss function $J_{QM}(\theta_1)$ shown in Equation (10). Also, the Q-function model updater 51 updates the parameter $\theta_1$ so as to reduce the value of the loss function $J_{QM}(\theta_2)$ obtained by replacing the parameter $\theta_1$ in Equation (10) with the parameter $\theta_2$.

The Q-function model updater 51 corresponds to an example of the evaluation model updating means.

The policy model updater 52 updates the parameter $\phi$. Specifically, the policy model updater 52 updates the parameter $\phi$ so as to increase the value of the objective function $J_\pi(\pi)$ described above. Since there are two Q-functions in the example embodiment, the policy model updater 52 applies the smaller of $Q_{\theta 1}(s, \pi_\phi(s))$ and $Q_{\theta 2}(s, \pi_\phi(s))$ to the objective function "$J_\pi(\phi)=[Q_\theta(s, \pi_\phi(s))]$" to "$Q_\theta(s, \pi_\phi(s))$" to update the parameter #.

The policy model updater 52 corresponds to an example of the policy model updating means.

The model calculator 53 calculates the values of the first Q-function model, the second Q-function model, and the policy model. For example, when the Q-function model updater 51 updates each of the first Q-function model and the second Q-function model, the model calculator 53 calculates the values of the first Q-function model, the second Q-function model and the policy model in Equations (8) to (10). Further, when the policy model updater 52 updates the policy model, the model calculator 53 calculates the value of the first Q-function model, the second Q-function model, and the policy model in order to calculate the value of the objective function $J_\pi(\phi)$. The model calculator 53 also calculates the values of the first Q-function model and the second Q-function model, which the priority calculator 37 refers to when calculating the experience priority.

The model calculator 53 corresponds to an example of the model calculation means.

Processing in Example Embodiment

Figure 4:
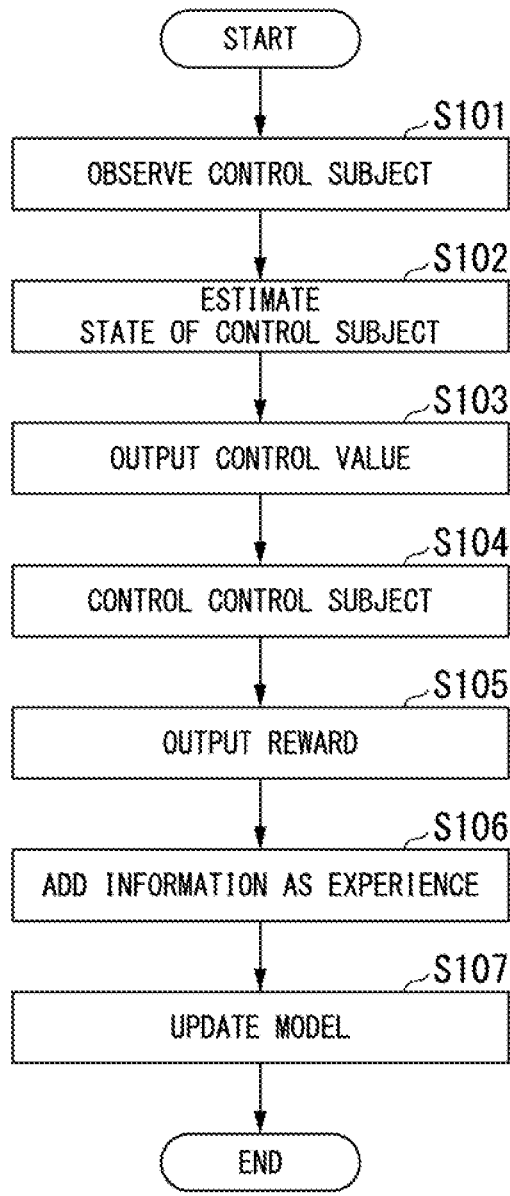
FIG. 4 is a flowchart showing an example of the processing procedure performed by the control system according to the example embodiment.

FIG. 4 is a flowchart showing an example of the procedure of processing performed by the control system 10. The control system 10 repeats the processing of FIG. 4.

In the process of FIG. 4, the observation device 12 observes the control subject 11 (Step S101). For example, the observation device 12 observes the control subject 11 and the surrounding environment.

Next, the state estimation device 13 estimates the state of the control subject 11 based on the observation information of the observation device 12 (Step S102). For example, the state estimation device 13 estimates a state that may affect control of the control subject 11, such as estimating a state including the control subject 11 and the surrounding environment thereof.

Next, the control determination device 20 refers to the state estimated by the state estimation device 13 and the policy model storage device 21 to calculate and output a control value (Step S103). Next, the control implementation device 15 implements control of the control subject 11 according to the control value output by the control determination device 20 (Step S104).

Next, the reward calculation device 14 calculates and outputs the reward by referring to the state estimated by the state estimation device 13 and the control value output by the control determination device 20 (Step S105).

Next, the learning device 30 adds and records the state estimated by the state estimation device 13, the control value output by the control determination device 20, and the reward output by the reward calculation device 14 as an experience in the experience storage device 31 (Step S106).

Next, the learning device 30 refers to the policy model stored in the policy model storage device 21, the Q-function model stored in the evaluation model storage device 40, and the experience stored in the experience storage device 31 to update these models (Step S107). Specifically, the policy model updater 52 updates the parameter $\phi$ of the policy model stored in the policy model storage device 21. The Q-function model updater 51 updates parameters $\theta_1$ and $\theta_2$ of the Q-function model stored in the evaluation model storage device 40.

After Step S107, the control system 10 terminates the processing of FIG. 4. As described above, the control system 10 repeats the series of processes from steps S101 to S107.

Figure 5:
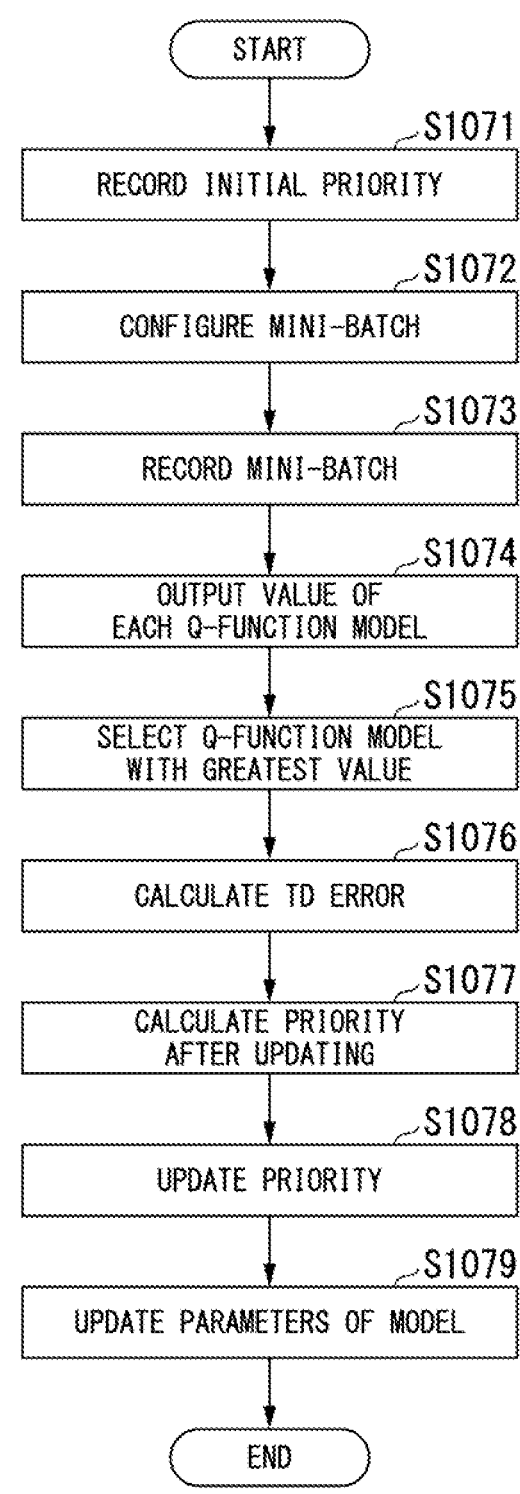
FIG. 5 is a flowchart showing an example of the processing procedure for updating a model by the control system according to the example embodiment.

FIG. 5 is a flowchart showing an example of the processing procedure by which the control system 10 updates the model. The control system 10 performs the processing of FIG. 5 in Step S107 of FIG. 4.

In the process of FIG. 5, the priority setter 38 additionally records in the priority storage device 33 the initial value of the priority for the experience added to the experience storage device 31 (Step S1071).

Next, the experience acquirer 34 performs PER to configure a mini-batch (Step S1072), and records the mini-batch in the mini-batch storage device 35 (Step S1073).

Next, the model calculator 53, referring to the mini-batch in the mini-batch storage device 35, the first Q-function model stored in the first Q-function model storage device 41, and the second Q-function model stored in the second Q-function model storage device 42, calculates the value of the first Q-function model and the second Q-function model when the state encompassed in each experience in the mini-batch and the set of control values s(s, a) are input, and outputs the values (Step S1074).

Subsequently, the priority calculator 37 selects the Q-function model with the maximum output value from the first Q-function model and the second Q-function model for each experience (Step S1075), and calculates the TD error for the selected Q-function model (Step S1076). Step S1075 corresponds to Equation (11). Step S1076 corresponds to Equation (12).

Next, the priority calculator 37 calculates the absolute value of the calculated TD error as a new priority (Step S1077). Subsequently, the priority setter 38 refers to the new priority calculated by the priority calculator 37, and updates the priority of the corresponding experience in the priority storage device 33 to the new priority (Step S1078).

Then, the model updater 50 uses the mini-batch in the mini-batch storage device 35 and the priority calculator 37 to update each parameter saved in the policy model storage device 21, the first Q-function model storage device 41, and the second Q-function model storage device 42 (Step S1079).

Specifically, the model calculator 53 reads the experience according to the priority from the mini-batch in the mini-batch storage device 35, and uses the read-out experience to calculate the values of the first Q-function model, the second Q-function model, and the policy model. The Q-function model updater 51 updates the first Q-function model and the second Q-function model by referring to the respective values of the first Q-function model, the second Q-function model, and the policy model. The policy model updater 52 updates the policy model by referring to the respective values of the first Q-function model, the second Q-function model, and the policy model.

After Step S1079, the control system 10 ends the processing of FIG. 5.

The priority calculated by the priority calculator 37 in Step S1077 is the absolute value of the TD error of the Q-function model that is more likely to cause overestimation. As a result, experiences that are more likely to cause overestimation in PER are more likely to be used for model updating. As a result, the problem of overestimation of the Q-function model can be positively mitigated, and as a result, learning becomes stable, so that the required arithmetic processing time can be shortened.

As described above, based on the state s' according to the action a in the state s of the control subject 11 and the action $\pi_\phi(s')$ calculated from the state s' using the policy model $\pi_\phi$, the model calculator 53 calculates the respective Q-function values using the two Q-function models $Q_{\theta'1}$ and $Q_{\theta'2}$ that calculate the Q-function values $Q_{\theta'1}(s', \pi_\phi(s'))$ and $Q_{\theta'2}(s', \pi_\phi(s'))$, which are index values of goodness of the action $\pi_\phi(s')$ in the state s'.

As described above, state s corresponds to an example of the first state. Action a corresponds to an example of the first action. State s' corresponds to an example of the second state. Action $\pi_\phi(s')$ corresponds to an example of the second action. The Q-function values $Q_{\theta'1}(s', \pi_\phi(s'))$ and $Q_{\theta'2}(s', \pi_\phi(s'))$ correspond to examples of second evaluation values. The Q-function models $Q_{\theta'1}$ and $Q_{\theta'2}$ correspond to examples of evaluation models.

The model updater 50 updates whichever Q-function value is smaller among $Q_{\theta'1}(s', \pi_\phi(s'))$ and $Q_{\theta'2}(s', \pi_\phi(s'))$, and updates the Q-function models $Q_{\theta'1}$ and $Q_{\theta'2}$ based on the reward r. The reward r corresponds to an example of the first evaluation value, which is an index value of the goodness of the action a in the state s.

In this way, by learning a Q-function model using a plurality of Q-function models, the learning device 30 can estimate the evaluation of an action using the Q-function with a relatively small value. As a result, overestimation of action evaluation such as overestimation of the Q-function model can be mitigated. In this regard, the learning device 30 can reduce the time required for reinforcement learning.

In addition, for each experience, the priority setter 38 associates a priority based on the magnitude of the error of the Q-function value when using that experience. The experience acquirer 34 acquires an experience based on priority.

As a result, the learning device 30 can learn the Q-function model by preferentially using an experience with an increasing error of the Q-function value, whereby it is expected that the error can be efficiently improved.

In this regard, the learning device 30 can reduce the time required for reinforcement learning.

Also, the experience acquirer 34 acquires a mini-batch of experiences sampled based on priority.

As a result, the learning device 30 can learn the evaluation function using a plurality of high-priority experiences.

The learning device 30 allows learning to be stable in that learning is performed using a plurality of experiences, and the time required for reinforcement learning can be shortened in that an experience with a high priority is used.

Example 1

Figure 6:
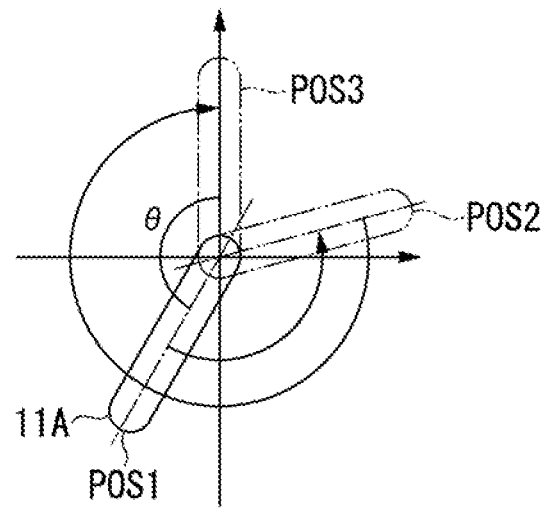
FIG. 6 is a diagram showing an example of a pendulum to be controlled in Example 1.

FIG. 6 is a diagram illustrating an example of a pendulum to be controlled in Example 1.

In the Example 1, an example in which the control system 10 inverts a pendulum as shown in FIG. 6 will be described. A pendulum 11A in FIG. 6 corresponds to an example of the control subject 11. This pendulum 11A has a motor attached to the shaft thereof, and the movement of the pendulum 11A can be controlled by the motor.

Here, the purpose of Example 1 is to acquire through learning an automatic control rule (policy for automatic control) for inverting the pendulum 11A (position POS3 in FIG. 6) within a time limit of 100 seconds and maintaining the inverted state as long as possible by controlling the motor.

However, the torque of this motor is not very strong, and for example, the pendulum 11A cannot be moved directly from the position POS1 to the position POS3 to be inverted. Therefore, in order to invert the pendulum 11A at position POS1, it is necessary to first apply torque to move the pendulum 11A to position POS2, for example, to accumulate potential energy to some extent, and then apply appropriate torque in the opposite direction to bring the pendulum 11A to position POS3.

In Example 1, unless otherwise specified, "π" indicates the circular constant and "0" indicates the angle.

In Example 1, the observation device 12 is a sensor that measures the angle θ of the pendulum 11A. Here, the angle is defined as $\theta \in [-\pi, \pi]$ with reference to the positive direction of the y-axis. Note that the position POS1 in FIG. 6 corresponds to $\theta = -5\pi/6$. Position POS2 corresponds to $\theta = 5\pi/12$. Position POS3 corresponds to $\theta = 0$.

The state s of the pendulum 11A is represented by an angle θ, an angular velocity θ', and each acceleration θ", being denoted as (θ, θ', θ"). In Example 1, the position POS1 is the initial position of the pendulum 11A, and the initial angle is $-5\pi/6$. Both the initial angular velocity and the initial angular acceleration are set to zero.

The state estimation device 13 estimates the true axis angle θ, the angular velocity θ', and the angular acceleration θ" from the sensor information of the observation device 12, and constitutes the information of state s=(θ, θ', θ"). The state estimation device 13 estimates the state every 0.1 second and outputs state information every 0.1 second. For example, a Kalman filter or the like is used as an algorithm for the state estimation device 13.

The reward calculation device 14 receives the information of the state s from the state estimation device 13 and calculates a reward function r(s)=−θ². It is assumed that this reward function is designed so that the longer the inversion time is, the higher the accumulated reward is, in accordance with the purpose of Example 1.

The control implementation device 15 receives the control value c from the control determination device 20 and controls the pendulum 11A. The control value c in Example 1 is the voltage V applied to the motor, and the value range of the control value c is [−2V, +2V]. It is also assumed that the control implementation device 15 keeps applying the same voltage to the motor until receiving a new control value c. The control value c indicates the action a of the pendulum 11A.

In addition, in 0.01 second from the state calculation of the state estimation device 13 (Step S102 in FIG. 4), the processing of the control determination device 20 (Step S103 in FIG. 4), the processing of the control implementation device 15 (Step S104 in FIG. 4), and the processing of the reward calculation device 14 (Step S105 in FIG. 4) are completed. As a result, the control value is changed 0.01 second after the state estimation device 13 estimates the state. The control determination interval is set to 0.1 second, like the state estimation interval.

Discrete time labels t=0, 1, 2, 3, . . . are defined as the control start time, (control start time+0.1 second later), (control start time+0.2 second later), (control start time+0.3 second later), . . . . The state vector estimated for the control start time, (control start time+0.1 second later), (control start time+0.2 second later), (control start time+0.3 second later), . . . is written as $s_0$, $s_1$, $s_2$, $s_3$, . . . . The control value calculated for the control start time, (control start time+0.1 second later), (control start time+0.2 second later), (control start time+0.3 second later), . . . is written as $c_0$, $c_1$, $c_2$, $c_3$, . . . . The action of the pendulum indicated by the control values $c_0$, $c_1$, $c_2$, $c_3$, . . . is written as $a_0$, $a_1$, $a_2$, $a_3$, . . . . The reward value calculated for the control start time, (control start time+0.1 second later), (control start time+0.2 second later), (control start time+0.3 second later), . . . is written as $r_0$, $r_1$, $r_2$, $r_3$, . . . .

The control determination device 20 receives the state s from the state estimation device 13, refers to the policy model stored in the policy model storage device 21, calculates the policy model, and transmits the calculation result to the control implementation device 15 as the control value c.

In Example 1, the policy model is a fully-connected neural network with two hidden layers, the input layer receiving the state s, and the output layer outputting the control value c. It is also assumed that the number of nodes per hidden layer is 256, and the tanh function is used as the activation function. All parameters of this neural network model are held in the policy model storage device 21.

The experience storage device 31 successively stores, at each time t, the set ($s_t$, $c_t$, $r_t$, $s_{t+1}$) of the state $s_t$ estimated by the state estimation device 13, the control value $c_t$ output by the control determination device 20, the reward value $r_t$ output by the reward calculation device 14, and the state $s_{t+1}$ estimated by the state estimation device 13 at the next time (t+1), that is, the "experience". As mentioned above, the control value $c_t$ indicates the action $a_t$.

Both the model stored in the first Q-function model storage device 41 of the evaluation model storage device 40 and the model stored in the second Q-function model storage device 42 are fully-coupled neural networks with two hidden layers, similarly to the policy model, with the number of nodes per hidden layer being 256, and the tanh function is used as the activation function. However, the input layer receives the pair of state and control values (s, c) and the output layer outputs the value of Q(s, c).

In the learning device 30, the priority setter 38 records the initial priority of the newly added experience in the priority storage device 33 (Step S1071 in FIG. 5). As the initial priority, the priority setter 38 assigns 1 to the first experience, and thereafter assigns "the maximum value among the priorities calculated so far".

The experience acquirer 34 samples experiences according to the probability shown in Equation (13).

[Equation 13]

$$P(i) = \frac{p_{(i)}^{\alpha}}{\sum_{k}^{K} p_{(k)}^{\alpha}} \tag{13}$$

i is the index of the experience in the experience storage device 31. $p_i$ is the priority for experience i. K is the total number of experiences in the experience storage device 31 at the time of sampling. α is a hyperparameter that adjusts the weight of priority p at the time of sampling. A value such as 0.6, for example, is used as the value of α. Also, here, the mini-batch contains 256 experiences, which is constructed by prioritized sampling.

The priority calculator 37 calculates a new priority for this mini-batch by the method described in the example embodiment. The priority setter 38 updates the priority associated with the target experience to the new priority.

The model updater 50 updates the model by minimizing the following three objective functions by stochastic gradient descent using all the experiences in the mini-batch.

The first objective function is an objective function for adjusting the parameter $\theta_1$ of the Q-function model, and is expressed as in Equation (14).

[Equation 14]

$$J_{\theta_1} = \frac{1}{N_B} \sum_{b=1}^{N_B} \omega_b \left( r_b + \gamma \min_{i=1,2} Q_{Q_i'}(s_b', \pi_\phi(s_b')) - Q_{\theta_1}(s_b, a_b) \right)^2 \tag{14}$$

"$\theta_1$" in Equation (14) indicates a parameter of the Q-function model. "$\pi_\phi$" indicates a policy.

b is the experience index and indicates the experience included in the mini-batch. $N_B$ indicates the number of experiences in the mini-batch. $\omega_b$ indicates a weight (weighting coefficient) according to the priority of experience.

Equation (14) corresponds to an example of the loss function shown in Equation (10). Specifically, the Equation (14) corresponds to an example in which the weight $\omega_b$ is introduced into the loss function shown in Equation (10) and embodied.

The second objective function is an objective function for adjusting the parameter $\theta_2$ of the Q-function model, and is expressed as Equation (15).

[Equation 15]

$$J_{\theta_2} = \frac{1}{N_B} \sum_{b=1}^{N_B} \omega_b \left( r_b + \gamma \min_{i=1,2} Q_{Q'_i}(s'_b, \pi_\phi(s'_b)) - Q_{\theta_2}(s_b, a_b) \right)^2 \quad (15)$$

"$\theta_2$" in Equation (15) indicates a parameter of the Q-function model. "$\pi_\phi$" indicates a policy.

Equation (15) corresponds to an example of a loss function obtained by replacing $\theta_1$ with $\theta_2$ in Equation (10). Specifically, Equation (15) corresponds to an example in which weight $\omega_b$ is introduced into the loss function obtained by replacing $\theta_1$ with $\theta_2$ in Equation (10) and embodied.

A third objective function is an objective function for adjusting the parameter $\phi$ of the policy model, and is shown as Equation (16).

[Equation 16]

$$J_\phi = -\frac{1}{N_B} \sum_{b=1}^{N_B} \omega_b Q_{\theta_1}(s_b, \pi_\theta(S_b)) \quad (16)$$

"$\theta_1$" in Equation (16) indicates a parameter of the Q-function model. "$\pi_\phi$" indicates a policy.

Equation (16) corresponds to an example of maximization of the equation "$J_\pi(\phi)=[Q_\theta(s, \pi_\phi(s))]$" of the above-described objective function $J_1(\#)$. Specifically, the Equation (16) corresponds to an example in which the weight $\omega_b$ is introduced into the equation "$J_\pi(\phi)=[Q_\theta(s, \pi_\phi(s))]$" and embodied. The value of the policy model parameter $\phi$ is adjusted to maximize the value of Equation (16).

The priority calculator 37 calculates the weight $\omega_b$ of the experience of the index b on the basis of, for example, Equation (17).

[Equation 17]

$$\omega_b = \left( \frac{1}{K} \cdot \frac{1}{P(b)} \right)^\beta \quad (17)$$

The weight $\omega_b$ shown in Equation (17) represents the importance weight when the priority sampling is regarded as the importance sampling. By using this importance weight, the effect of correcting the bias due to prioritized sampling can be obtained.

In Example 1, the learning rate is 0.003 and the number of epochs is 1 when using the stochastic gradient descent method.

The degree of influence of the weight $\omega_b$ (importance weight) can be adjusted with the hyperparameter $\beta$. In this case, the priority calculator 37 inputs the value of the weight $\omega_b$ calculated using Equation (17) to $\omega_b$ from Equations (14) to (16).

The value range of $\beta$ is [0, 1], and the closer $\beta$ is to 0, the weaker the influence of the importance weight is, and the closer $\beta$ is to 1, the more faithfully the influence of the importance weight is reproduced. $\beta=0.4$ is used here because the learning efficiency in the early stage of learning is better if the bias due to sampling with priority is left to some extent. The priority calculator 37 may change the value of the hyperparameter $\beta$ according to, for example, the number of times the process of FIG. 4 is executed.

The priority calculator 37 may scale the weight $\omega_b$ separately from applying the hyperparameter $\beta$. Here, in order to maintain the stability of learning, a value obtained by dividing $\omega_b$ by $\omega_{max}$ is used as an actual importance weight value. $\omega_{max}$ takes a value calculated using the maximum value for all priorities in priority storage device 33.

The priority calculator 37 inputs the value obtained by dividing the weight $\omega_b$ calculated using Equation (17) by $\omega_{max}$ as $\omega_b$ into Equations (14) to (16).

As a first effect of the Example 1, it is possible to introduce priority sampling suitable for using two Q-functions in order to alleviate the problem of overestimation of the Q-function.

As a second effect in Example 1, by defining the priority of experience, it is expected that the overestimation problem of the Q-function model is actively alleviated, and a good Q-function model and policy model can be obtained with a smaller number of experiences.

Due to the above two effects, it is expected that in the "inverted pendulum" problem, an inverted policy model can be obtained with "a small number of experiences" compared to the case where the technology of the present invention is not used.

Example 2

Example 2 describes an example in which the control system 10 automatically controls a VAM (Vinyl Acetate Monomer) plant, which is a type of chemical plant.

Although the VAM plant simulator serves as the control subject 11 here, if the VAM plant simulator sufficiently reproduces reality, the control subject 11 may be replaced with an actual VAM plant after learning the policy model. Example 2 will be described on the premise that the control subject 11 is replaced with an actual VAM plant.

Figure 7:
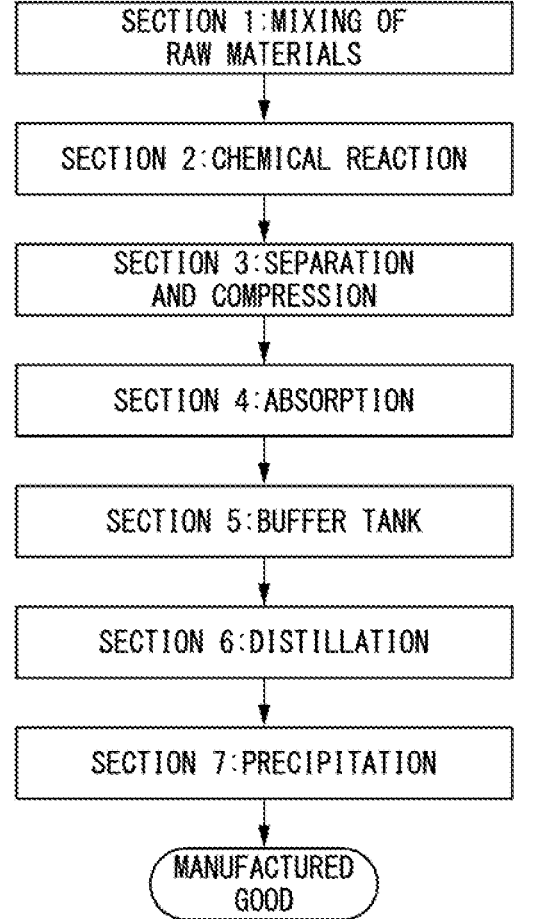
FIG. 7 is a diagram showing a configuration example of sections in a VAM plant according to Example 2.

FIG. 7 is a diagram showing a configuration example of sections in a VAM plant. The VAM plant consists of sections with seven different roles.

Section 1 mixes VAM raw materials. A chemical reaction takes place in Section 2 to produce VAM. Sections 3 through 5 perform VAM separation, compression and absorption. Distillation and precipitation of VAM are performed in Sections 6 and 7. The VAM obtained by these series of steps is put on the market as a product.

The entire VAM plant of Example 2 is equipped with about 100 observation instruments for measuring pressure, temperature, flow rate, etc., and about 30 PID (Proportional-Integral-Differential) controllers for adjusting pressure, temperature, flow rate, and the like. In Example 2, the object is to obtain a policy model that increases the overall profit of this VAM plant. Here, the total revenue is the product profit (VAM) minus the consumption costs (ethylene, oxygen acetate, electricity, water, etc.).

The control time of the VAM plant is assumed to be 100 hours, with the ultimate objective being to improve the accumulated total profit during this control time from the value when the initial state is continued. The initial state here means a state in which the target value of each PID controller is manually adjusted and the VAM plant as a whole is in a steady state. This initial state is prepared in advance by the VAM plant simulator.

In Example 2, the observation device 12 is configured using about 100 observation instruments described above. The VAM plant simulator used can acquire important physical quantities that cannot be measured by observation instruments, but they are not used. This is to replace the VAM plant simulator with an actual VAM plant.

The state estimation device 13 estimates physical quantities such as true temperature, pressure, and flow rate from the information of the observation device 12, and configures the state. State estimation is assumed to be performed every 30 minutes, with the state information also being output every 30 minutes. For the algorithm of the state estimation device 13, for example, a Kalman filter or the like is used.

The reward calculation device 14 receives state s from the state estimation device 13 and calculates the overall profit, r(s), described above. The calculation method conforms to the VAM plant simulator. The higher the overall profit, the higher the reward.

The control implementation device 15 receives the control value c from the control determination device 20 and controls the VAM plant simulator. The control value c in Example 2 is the target value of each PID controller. The control implementation device 15 maintains the same target value until receiving a new control value c. The control value c indicates the action a of the VAM plant.

In one second from the state calculation of the state estimation device 13 (Step S102 in FIG. 4), the processing of the control determination device 20 (Step S103 in FIG. 4), the processing of the control implementation device 15 (Step S104 in FIG. 4), and the processing of the reward calculation device 14 (Step S105 in FIG. 4) are completed. As a result, the control value is changed one second after the state estimation by the state estimation device 13. The control determination interval is 30 minutes, like the state estimation interval.

Discrete time labels t=0, 1, 2, 3, . . . are defined as the control start time, (control start time+30 minutes later), (control start time+60 minutes later), (control start time+90 minutes later), . . . .

The control determination device 20, the policy model storage device 21, the learning device 30, the experience storage device 31, and the evaluation model storage device 40 are the same as those in the Example 1, with descriptions thereof being omitted.

The two effects in Example 2 are the same as in Example 1. As a result, it is possible to acquire a policy model that improves the overall profit with "a small number of experiences" compared to the case where the technology of the present invention is not used, and if the VAM plant simulator sufficiently reproduces reality, it is possible to produce an equivalent improvement in overall profitability if the policy model is applied to an actual VAM plant.

Example 3

In Example 3, a case where the control system 10 automatically controls a humanoid robot will be described. As in the case of Example 2, Example 3 will also be described with the application of the policy model learned by the simulation to an actual control subject in mind. That is, here, the control subject 11 is a humanoid robot on a simulator, and it is considered that the policy obtained using the simulator is applied to an actual humanoid robot.

In Example 3, the ultimate goal is to acquire a policy model that allows the humanoid robot to continue bipedal walking without falling over during the control time of 100 seconds. The humanoid robot to be controlled has 17 joints, each with a motor. The observation device 12 includes sensors that measure the angle and torque of each joint, and LiDAR (Light Detection and Ranging) mounted on the head. The simulator used can acquire important physical quantities that cannot be measured by the observation device 12, but they are not used. This is for applying to an actual humanoid robot.

The state estimation device 13 estimates the true angle, angular velocity, angular acceleration, and torque of each joint, the absolute coordinates of the center of gravity of the robot, the velocity of the center of gravity, and the load applied to each joint from the information of the observation device 12, and configures the state. State estimation is performed every 0.1 second, and state information is also output every 0.1 second. For the algorithm of the state estimation device 13, for example, a Kalman filter, SLAM (Simultaneous Localization And Mapping), or the like is used.

The reward calculation device 14 takes as input the set (s, c, s') of the state s output by the state estimation device 13, the control value c output by the control determination device 20, and the state output by the state estimation device 13 immediately after the control value c is implemented by the control implementation device 15, that is, the state s' after the state transition, and calculates the reward function r(s, c, s'). A control value c indicates the action of the robot.

The reward calculation method conforms to OpenAI's Gym. Basically, the higher the speed of the center of gravity of the humanoid robot in the forward direction, the higher the reward. Also, in order to save power as much as possible, points are deducted as the torque of the motor increases. Also, bonus points are given if the center of gravity is maintained at a high position so that the humanoid robot does not fall over.

The control implementation device 15 receives the control value c from the control determination device 20 and controls the torque of the motor of each joint. In addition, in 0.01 second from the state calculation of the state estimation device 13 (Step S102 in FIG. 4), the processing of the control determination device 20 (Step S103 in FIG. 4), the processing of the control implementation device 15 (Step S104 in FIG. 4), and the processing of the reward calculation device 14 (Step S105 in FIG. 4) are completed. As a result, the control value is changed 0.01 second after the state estimation device 13 estimates the state. The control determination interval is set to 0.1 second, like the state estimation interval. Also, the discrete time label t is defined in accordance with the state estimation timing as in Example 1.

The control determination device 20, the policy model storage device 21, the learning device 30, the experience storage device 31, and the evaluation model storage device 40 are the same as those in Example 1, and so descriptions thereof are omitted here.

The two effects in Example 3 are the same as in Example 1. As a result, compared with the case where the technology of the present invention is not employed, it is possible to obtain a policy model in which a humanoid robot walks on two legs without falling over with "a small number of experiences", and when the humanoid robot model sufficiently reproduces reality, a comparable overall profit improvement can be obtained even when the policy model is applied to an actual humanoid robot.

Figure 8:
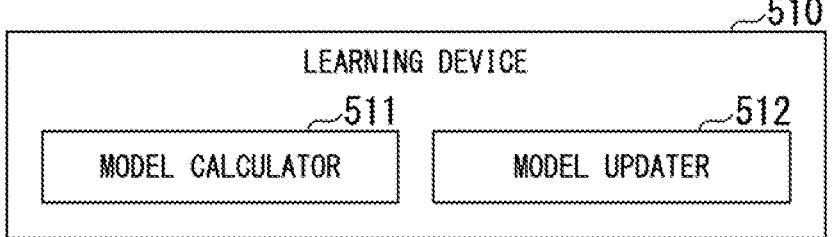
FIG. 8 is a diagram showing a configuration example of the learning device according to the example embodiment.

FIG. 8 is a diagram illustrating a configuration example of a learning device according to the example embodiment. With the configuration shown in FIG. 8, a learning device 510 is provided with a model calculator 511 and model updater 512.

With such a configuration, the model calculator 511, on the basis of a second state corresponding to a first action of a control subject in a first state and a second action calculated from the second state using a policy model, uses a plurality of evaluation models that each calculate a second evaluation value, which is an index value of the goodness of the second action in the second state, and respectively calculate second evaluation values. The model updater 512 updates the evaluation model on the basis of the smallest second evaluation value among the plurality of second evaluation values and a first evaluation value, which is an index value of the goodness of the first action in the first state.

The model calculator 511 corresponds to an example of the model calculation means. The model updater 512 corresponds to an example of the model updating means.

In this way, the learning device 510 uses a plurality of evaluation functions to perform evaluation function learning, whereby an evaluation function can be estimated using an evaluation function with a relatively small value. As a result, overestimation of the evaluation function, such as overestimation of the Q-function model, can be mitigated. In this regard, the learning device 510 can reduce the time required for reinforcement learning.

The model calculator 511 can be implemented using functions such as the model calculator 53 illustrated in FIG. 3, for example. The model updater 512 can be implemented using the functions of the model updater 50 and the like illustrated in FIG. 3, for example. Therefore, the learning device 510 can be implemented using the functions of the learning device 30 or the like illustrated in FIG. 3.

Figure 9:
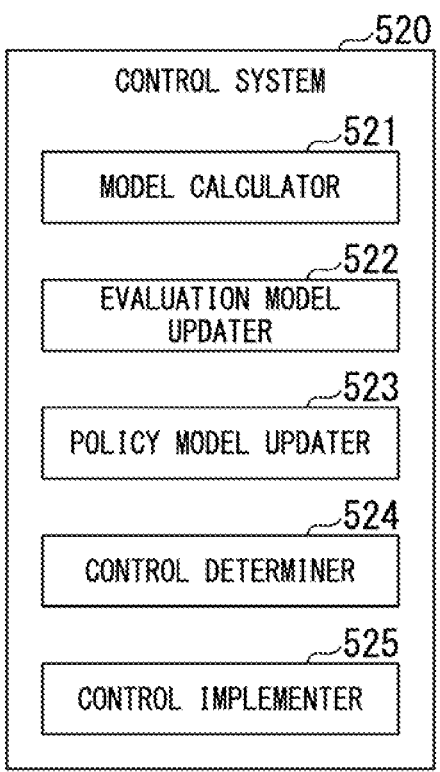
FIG. 9 is a diagram showing a configuration example of the control system according to the example embodiment.

FIG. 9 is a diagram illustrating a configuration example of a control system according to the example embodiment. With the configuration shown in FIG. 9, a control system 520 is provided with a model calculator 521, an evaluation model updater 522, a policy model updater 523, a control determiner 524, and a control implementer 525.

With such a configuration, the model calculator 521, on the basis of a second state corresponding to a first action of a control subject in a first state and a second action calculated from the second state using a policy model, uses a plurality of evaluation models that each calculate a second evaluation value, which is an index value of the goodness of the second action in the second state, and respectively calculate second evaluation values. The evaluation model updater 522 updates the evaluation model on the basis of the smallest second evaluation value among the plurality of second evaluation values and a first evaluation value, which is an index value of the goodness of the first action in the first state. The policy model updater 523 updates the policy model using the evaluation model. The control determiner 524 calculates a control value using the policy model. The control implementer 525 controls the control subject based on the control value.

The model calculator 521 corresponds to an example of the model calculation means. The evaluation model updater 522 corresponds to an example of the evaluation model updating means. The policy model updater 523 corresponds to an example of the policy model updating means. The control determiner 524 corresponds to an example of the control determination means. The control implementer 525 corresponds to an example of the control implementation means.

In this way, the control system 520 uses a plurality of evaluation functions to perform evaluation function learning, whereby an evaluation function can be estimated using an evaluation function with a relatively small value. As a result, overestimation of the evaluation function, such as overestimation of the Q-function model, can be mitigated. In this regard, the control system 520 can reduce the time required for reinforcement learning.

The model calculator 521 can be implemented using functions such as the model calculator 53 illustrated in FIG. 3, for example. The evaluation model updater 522 can be realized, for example, by using functions of the Q-function model updater 51 and the like as illustrated in FIG. 3. The policy model updater 523 can be realized, for example, by using the functions of the policy model updater 52 and the like as illustrated in FIG. 3. The control determiner 524 can be realized, for example, by using functions of the control determination device 20 and the like as illustrated in FIG. 1. The control implementer 525 can be realized using functions such as the control implementation device 15 as illustrated in FIG. 1, for example. Thus, the control system 520 can be implemented using functions of the control system 10 and the like as illustrated in FIGS. 1~3.

Figure 10:
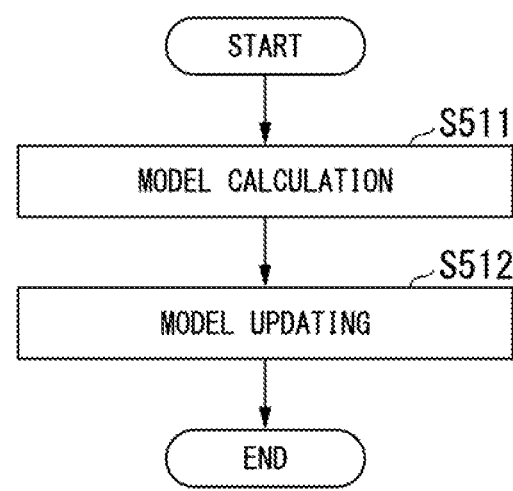
FIG. 10 is a diagram showing an example of the processing procedure in the learning method according to the example embodiment.

FIG. 10 is a diagram showing an example of the processing procedure in the learning method according to the example embodiment. The learning method shown in FIG. 10 includes a model calculation step (Step S511) and a model updating step (Step S512).

With such a configuration, the model calculation step (Step S511), on the basis of a second state corresponding to a first action of a control subject in a first state and a second action calculated from the second state using a policy model, uses a plurality of evaluation models that each calculate a second evaluation value, which is an index value of the goodness of the second action in the second state, and respectively calculate second evaluation values. The model updating step (Step S512) updates the evaluation model on the basis of the smallest second evaluation value among the plurality of second evaluation values and a first evaluation value, which is an index value of the goodness of the first action in the first state.

The learning method of FIG. 10 uses a plurality of evaluation functions to perform evaluation function learning, whereby an evaluation function can be estimated using an evaluation function with a relatively small value. As a result, overestimation of the evaluation function, such as overestimation of the Q-function model, can be alleviated. According to the learning method of FIG. 10, in this respect, it is possible to shorten the time required for reinforcement learning.

Figure 11:
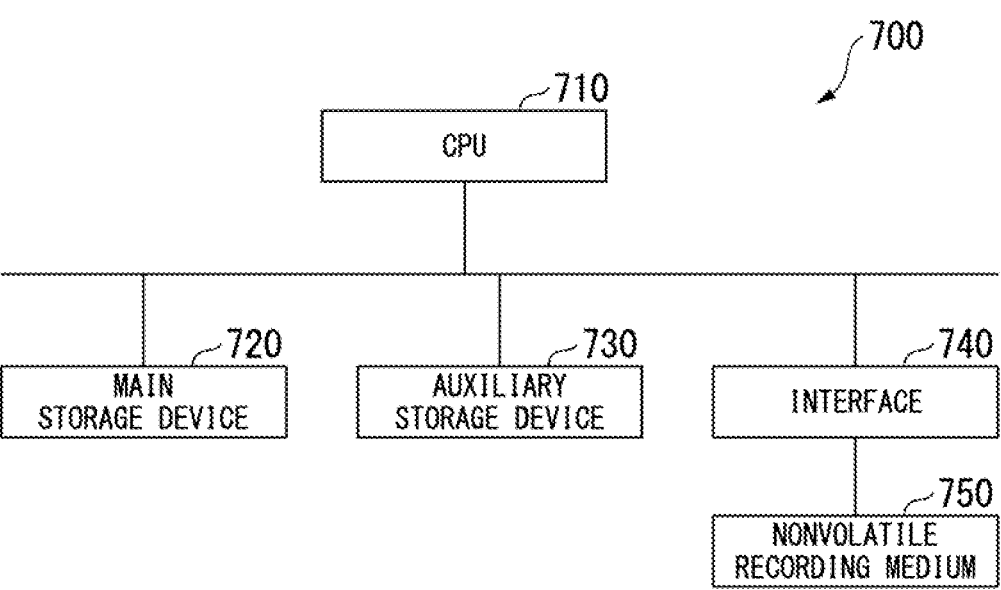
FIG. 11 is a schematic block diagram showing the configuration of a computer according to at least one example embodiment.

FIG. 11 is a schematic block diagram showing the configuration of a computer according to at least one example embodiment.

With the configuration shown in FIG. 11, a computer 700 is provided with a CPU 710, a main storage device 720, an auxiliary storage device 730, an interface 740, and a non-volatile recording medium 750.

Any one or more of the learning device 30, the learning device 510 and the control system 520 may be implemented in the computer 700. In that case, the operation of each processing unit described above is stored in the auxiliary storage device 730 in the form of a program. The CPU 710 reads out the program from the auxiliary storage device 730, deploys the program in the main storage device 720, and executes the above processing according to the program. In addition, the CPU 710 secures storage areas corresponding to the storage units described above in the main storage device 720 according to the program. Communication between each device and another device is performed by the interface 740 having a communication function and performing communication under the control of the CPU 710. The interface 740 also has a port for the nonvolatile recording medium 750 and thereby reads information from the nonvolatile recording medium 750 and writes information to the nonvolatile recording medium 750.

When the learning device 30 is implemented in the computer 700, the operations of the experience acquirer 34, the priority calculator 37, the priority setter 38, the model updater 50, the Q-function model updater 51, and the policy model updater 52 are stored in the auxiliary storage device 730 in the form of a program. The CPU 710 reads out the program from the auxiliary storage device 730, deploys the program in the main storage device 720, and executes the above processing according to the program.

The CPU 710 also secures storage areas corresponding to the priority storage device 33 and the mini-batch storage device 35 in the main storage device 720 according to the program.

Communication between the learning device 30 and other devices is performed by the interface 740 having a communication function and operating under the control of the CPU 710.

When the learning device 510 is implemented in the computer 700, the operations of the model calculator 511 and the model updater 512 are stored in the auxiliary storage device 730 in the form of programs. The CPU 710 reads out the program from the auxiliary storage device 730, deploys the program in the main storage device 720, and executes the above processing according to the program.

In addition, the CPU 710 reserves a storage area in the main storage device 720 for the processing performed by the learning device 510 according to the program.

Communication between the learning device 510 and other devices is performed by the interface 740 having a communication function and operating under the control of the CPU 710.

When the control system 520 is implemented in the computer 700, the operations of the model calculator 521, the evaluation model updater 522, the policy model updater 523, the control determiner 524, and the control implementer 525 are stored in the auxiliary storage device 730 in the form of programs. The CPU 710 reads out the program from the auxiliary storage device 730, deploys the program in the main storage device 720, and executes the above processing according to the program.

In addition, the CPU 710 reserves a storage area in the main storage device 720 for processing performed by the control system 520 according to the program.

Communication between the control system 520 and other devices, such as transmission of control signals from the control implementer 525 to the control subject, is performed by the interface 740 having a communication function and operating under the control of the CPU 710.

Any one or more of the programs described above may be recorded in the nonvolatile recording medium 750. In this case, the interface 740 may read the program from the nonvolatile recording medium 750. Then, the CPU 710 may directly execute the program read by the interface 740, or execute the program after being temporarily stored in the memory device 720 or the auxiliary storage device 730.

A program for executing all or part of the processing performed by learning device 30, learning device 510, and control system 520 may be recorded on a computer-readable recording medium, and the program recorded on this recording medium may be read into a computer system and executed, whereby the processing of each unit may be performed. It should be noted that the "computer system" referred to here includes an operating system and hardware such as peripheral devices.

In addition, the "computer-readable recording medium" refers to portable media such as flexible discs, magneto-optical discs, ROMs (Read Only Memories), CD-ROMs (Compact Disc Read Only Memories), and storage devices such as hard disks built into computer systems. Further, the program may be for realizing some of the functions described above, or may be capable of realizing the functions described above in combination with a program already recorded in the computer system.

Although example embodiments of the present invention have been described in detail with reference to the drawings, the specific configuration is not limited to these example embodiments, and designs and the like are included within the scope of the gist of the present invention.

INDUSTRIAL APPLICABILITY

The example embodiment of the present invention may be applied to a learning device, a learning method, a control system, and a recording medium.

REFERENCE SIGNS LIST

10, 520 control system
11 Control subject
12 Observation device
13 State estimation device
14 Reward calculation device
15 Control implementation device
20 Control determination device
21 Policy model storage device
30, 510 Learning device
31 Experience storage device
33 Priority storage device
34 Experience acquirer
35 Mini-batch storage device
37 Priority calculator
38 Priority setter
40 Evaluation model storage device
41 First Q-function model storage device
42 Second Q-function model storage device
50, 512 Model updater
51 Q-function model updater
52, 523 Policy model updater
53, 511, 521 Model calculator
522 Evaluation model updater
524 Control determiner
525 Control implementer

What is claimed is:

1. A learning device comprising:

a memory configured to store instructions; and one or more processors configured to execute the instructions to:

associate a priority based on a magnitude of an error with an experience, the experience is a combination of a first state of a control subject, a first action of the control subject in the first state, a reward according to the first action in the first state, and a second state according to the first action in the first state, wherein the error is between 1) an evaluation value obtained based on a minimum evaluation value among evaluation values for the second action in the second state, which is the evaluation value in the first state indicated in the experience, and which is the evaluation value for the first action indicated in the experience, the evaluation value being obtained by applying the reward indicated in the experience, the second state indicated in the experience, and the second action calculated from the second state using a policy model to a plurality of evaluation models obtained by setting a plurality of parameter values in an evaluation model body, and 2) an evaluation value obtained for each evaluation model by applying the first state indicated in the experience and the first action indicated in the experience to a plurality of evaluation models obtained by setting a plurality of parameter values in the evaluation model body, and is a maximum evaluation value among the evaluation values for the first action in the first state;

acquire the experience based on the priority;

apply the second state indicated in the experience acquired and the second action calculated from the second state using the policy model to the plurality of evaluation models obtained by setting the plurality of parameter values in the evaluation model body, and calculating the evaluation value for the second action in the second state for each evaluation model; and update the evaluation model based on a minimum evaluation value among the evaluation values calculated for each evaluation model and the evaluation value for the first action indicated in the experience acquired in the first state indicated in the experience.

2. The learning device according to claim 1, wherein the one or more processors are configured to further execute the instructions to acquire a mini-batch of the experiences sampled based on the priority.

3. A control system comprising:

a memory configured to store instructions; and one or more processors configured to execute the instructions to:

associate a priority based on a magnitude of an error with an experience, the experience is a combination of a first state of a control subject, a first action of the control subject in the first state, a reward according to the first action in the first state, and a second state according to the first action in the first state, wherein the error is between 1) an evaluation value obtained based on a minimum evaluation value among evaluation values for the second action in the second state, which is the evaluation value in the first state indicated in the experience, and which is the evaluation value for the first action indicated in the experience, the evaluation value being obtained by applying the reward indicated in the experience, the second state indicated in the experience, and the second action calculated from the second state using a policy model to a plurality of evaluation models obtained by setting a plurality of parameter values in an evaluation model body, and 2) an evaluation value obtained for each evaluation model by applying the first state indicated in the experience and the first action indicated in the experience to a plurality of evaluation models obtained by setting a plurality of parameter values in the evaluation model body, and is a maximum evaluation value among the evaluation values for the first action in the first state;

acquire the experience based on the priority;

apply the second state indicated in the experience acquired and the second action calculated from the second state using the policy model to the plurality of evaluation models obtained by setting the plurality of parameter values in the evaluation model body, and calculating the evaluation value for the second action in the second state for each evaluation model;

update the evaluation model based on a minimum evaluation value among the evaluation values calculated for each evaluation model and the evaluation value for the first action indicated in the experience acquired in the first state indicated in the experience;

update the policy model using the evaluation model;

calculate a control value using the policy model; and control a control subject on the basis of the control value.

4. A learning method executed by a computer, the learning method comprising:

associating a priority based on a magnitude of an error with an experience, the experience is a combination of a first state of a control subject, a first action of the control subject in the first state, a reward according to the first action in the first state, and a second state according to the first action in the first state, wherein the error is between 1) an evaluation value obtained based on a minimum evaluation value among evaluation values for the second action in the second state, which is the evaluation value in the first state indicated in the experience, and which is the evaluation value for the first action indicated in the experience, the evaluation value being obtained by applying the reward indicated in the experience, the second state indicated in the experience, and the second action calculated from the second state using a policy model to a plurality of evaluation models obtained by setting a plurality of parameter values in an evaluation model body, and 2) an evaluation value obtained for each evaluation model by applying the first state indicated in the experience and the first action indicated in the experience to a plurality of evaluation models obtained by setting a plurality of parameter values in the evaluation model body, and is a maximum evaluation value among the evaluation values for the first action in the first state;

acquiring the experience based on the priority;

applying the second state indicated in the experience acquired and the second action calculated from the second state using the policy model to the plurality of evaluation models obtained by setting the plurality of parameter values in the evaluation model body, and calculating the evaluation value for the second action in the second state for each evaluation model; and updating the evaluation model based on a minimum evaluation value among the evaluation values calculated for each evaluation model and the evaluation value for the first action indicated in the experience acquired in the first state indicated in the experience.

* * * * *